US012095133B2

(12) United States Patent
Saraf

(10) Patent No.: US 12,095,133 B2
(45) Date of Patent: Sep. 17, 2024

(54) THREE WAVEGUIDE DIPLEXER OPERATING OVER TWO FREQUENCY RANGES AND INCLUDING A THREE CONDUCTOR TRANSMISSION DEVICE COUPLED BETWEEN THE THREE WAVEGUIDES OF THE DIPLEXER

(71) Applicant: MTI WIRELESS EDGE, LTD., Rosh Ha'ayin (IL)

(72) Inventor: Israel Saraf, Beit-El (IL)

(73) Assignee: MTI WIRELESS EDGE, LTD., Rosh Ha'ayin (IL)

( * ) Notice: Subject to any disclaimer, the term of this patent is extended or adjusted under 35 U.S.C. 154(b) by 385 days.

(21) Appl. No.: 17/501,694

(22) Filed: Oct. 14, 2021

(65) Prior Publication Data

US 2022/0200122 A1 Jun. 23, 2022

(30) Foreign Application Priority Data

Dec. 23, 2020 (IL) .......................................... 279715

(51) Int. Cl.
*H01P 1/213* (2006.01)
*H01P 3/12* (2006.01)
*H01P 3/16* (2006.01)
*H01P 5/16* (2006.01)

(52) U.S. Cl.
CPC .............. *H01P 1/2131* (2013.01); *H01P 3/12* (2013.01); *H01P 3/16* (2013.01); *H01P 5/16* (2013.01)

(58) Field of Classification Search
CPC ............................. H01P 1/2131; H01P 1/2138
USPC .......................................................... 333/126
See application file for complete search history.

(56) References Cited

U.S. PATENT DOCUMENTS 3,500,419 A * 3/1970 Leitner et al. ........... H01Q 5/45 343/781 R
3,508,277 A * 4/1970 Ware et al. ............ H01Q 13/08 343/776
4,785,296 A 11/1988 Tabata et al.
6,081,170 A * 6/2000 Enokuma ................. H01Q 5/47 333/21 A
2004/0036661 A1 2/2004 Hanlin et al.
2009/0027142 A1 1/2009 Sanders
2017/0324164 A1 11/2017 Cook
2019/0288394 A1 9/2019 Saraf

* cited by examiner

*Primary Examiner* — Benny T Lee
(74) *Attorney, Agent, or Firm* — Browdy and Neimark, PLLC

(57) ABSTRACT

A diplexer for an antenna comprises a first waveguide operative in a first frequency range, a second waveguide operative in a second higher frequency range, a third waveguide operative in the first frequency range, a transmission device including at least three electric conductors, in which at least one of (i) or (ii) is met: (i) the transmission device is operative to receive electromagnetic radiations with at least one type of polarization and in the first frequency range from the third waveguide and to transmit electromagnetic radiations with the type of polarization and in the first frequency range to the first waveguide; (ii) the transmission device is operative to receive electromagnetic radiations with at least one type of polarization and in the first frequency range from the first waveguide and to transmit electromagnetic radiations with the type of polarization and in the first frequency range to the third waveguide.

19 Claims, 12 Drawing Sheets

THREE WAVEGUIDE DIPLEXER OPERATING OVER TWO FREQUENCY RANGES AND INCLUDING A THREE CONDUCTOR TRANSMISSION DEVICE COUPLED BETWEEN THE THREE WAVEGUIDES OF THE DIPLEXER

TECHNICAL FIELD

The presently disclosed subject matter relates to antenna elements and to antennas.

In particular, it relates to new systems and methods for a dual-band antenna.

BACKGROUND

A dual-band antenna operates on at least two frequency bands, either one at a time, or simultaneously.

U.S. Pat. No. 4,785,296 and U.S. patent application Ser. No. 16/357,422 constitute background to the presently disclosed subject matter. Acknowledgement of the above references herein is not to be inferred as meaning that these references are in any way relevant to patentability of the presently disclosed subject matter.

There exists a need to propose new solutions for improving the structure and operation of antenna(s), and in particular of dual-band antennas.

GENERAL DESCRIPTION

In accordance with certain aspects of the presently disclosed subject matter, there is provided a diplexer for an antenna, comprising a first waveguide configured to communicate electromagnetic radiations falling in a first frequency range, a second waveguide located within the first waveguide, the second waveguide being configured to communicate electromagnetic radiations falling in a second frequency range, wherein the second frequency range is higher than the first frequency range, a third waveguide configured to communicate electromagnetic radiations falling in the first frequency range, and a transmission device comprising at least three electric conductors, wherein at least one of (a) or (b) is met:

(a) the transmission device is operative to receive electromagnetic radiations with at least one type of polarization and falling in the first frequency range from the third waveguide and to transmit electromagnetic radiations with the type of polarization and falling in the first frequency range to the first waveguide;

(b) the transmission device is operative to receive electromagnetic radiations with at least one type of polarization and falling in the first frequency range from the first waveguide and to transmit electromagnetic radiations with the type of polarization and falling in the first frequency range to the third waveguide.

In addition to the above features, the diplexer according to this aspect of the presently disclosed subject matter can optionally comprise one or more of features (i) to (xxxii) below, in any technically possible combination or permutation:

i. the transmission device is operative to receive electromagnetic radiations with a linear polarization from the third waveguide and to transmit electromagnetic radiations with a linear polarization to the first waveguide;

ii. the transmission device is operative to receive electromagnetic radiations with a linear polarization from the first waveguide and to transmit electromagnetic radiations with a linear polarization to the third waveguide;

iii. the transmission device is operative to receive electromagnetic radiations with two orthogonal linear polarizations from the third waveguide and to transmit electromagnetic radiations with two orthogonal linear polarizations to the first waveguide;

iv. the transmission device is operative to receive electromagnetic radiations with two orthogonal linear polarizations from the first waveguide and to transmit electromagnetic radiations with two orthogonal linear polarizations to the third waveguide;

v. the transmission device is configured to pass simultaneously two different orthogonal polarizations of the electromagnetic radiations between the third waveguide and the first waveguide;

vi. the transmission device is operative to receive electromagnetic radiations with a circular polarization from the third waveguide and to transmit electromagnetic radiations with a circular polarization to the first waveguide;

vii. the transmission device is operative to receive electromagnetic radiations with a circular polarization from the first waveguide and to transmit electromagnetic radiations with a circular polarization to the third waveguide;

viii. the transmission device is operative to receive electromagnetic radiations with an elliptical polarization from the third waveguide and to transmit electromagnetic radiations with an elliptical polarization to the first waveguide;

ix. the transmission device is operative to receive electromagnetic radiations with an elliptical polarization from the first waveguide and to transmit electromagnetic radiations with an elliptical polarization to the third waveguide;

x. a portion of the at least two electric conductors is configured to operate in at least one of two electric modes, the two electric modes comprising an odd mode and/or an even mode;

xi. electromagnetic radiations with a first linear polarization in the third waveguide induce an odd mode in at least a portion of two electric conductors of the transmission device, wherein the transmission device is configured to transmit electromagnetic radiations in the first waveguide with a linear polarization;

xii. electromagnetic radiations with a first linear polarization in the first waveguide induce an odd mode in at least the portion of the two electric conductors, wherein the transmission device is configured to transmit electromagnetic radiations in the third waveguide with the first linear polarization;

xiii. a direction of the linear polarization is identical to a direction of the first linear polarization or is different from the direction of the first linear polarization;

xiv. electromagnetic radiations with a second linear polarization in the third waveguide induce an even mode in at least a portion of the two electric conductors, wherein the transmission device is configured to transmit electromagnetic radiations in the first waveguide with a second linear polarization;

xv. electromagnetic radiations with the second linear polarization in the first waveguide induce an even mode in at least the portion of the two electric conductors, wherein the transmission device is configured to transmit electromagnetic radiations in the third waveguide with a linear polarization;

xvi. electromagnetic radiations with the second polarization in the first waveguide or in the third waveguide induce an even mode with electric currents along a first direction in at least the portion of the two electric conductors and an electric current in a third conductor of the transmission device along a second direction opposite to the first direction;

xvii. a direction of the linear polarization is identical to a direction of the second linear polarization or is different from the direction of the second linear polarization;

xviii. electromagnetic radiations in the first waveguide, with two orthogonal linear polarizations, induce both an even mode and an odd mode in at least a portion of the two electric conductors, wherein the transmission device is configured to transmit electromagnetic radiations in the third waveguide with two orthogonal linear polarizations;

xix. electromagnetic radiations in the third waveguide, with two orthogonal linear polarizations, induce both an even mode and an odd mode in at least the portion of the two electric conductors, wherein the transmission device is configured to transmit electromagnetic radiations in the first waveguide with two orthogonal linear polarizations;

xx. in the first waveguide, an angle between a first part of a first conductor of the three conductors, and a first part of a second conductor of the three conductors, is above ten degrees;

xxi. in the third waveguide, an angle between a second part of a first conductor of the three conductors, and a second part of a second conductor of the three conductors, is above ten degrees;

xxii. a minimal distance between the transmission device and an external wall of the second waveguide is equal to or greater than $\lambda_{max,\,HB}/16$, wherein $\lambda_{max,\,HB}/16$ is a maximal wavelength of the second frequency range;

xxiii. a portion of the transmission device located in the first waveguide has a semi-circular shape;

xxiv. the transmission device comprises an electronic circuit, wherein two conductors of the three conductors are located on the same side of the electronic circuit;

xxv. the transmission device comprises an electronic circuit, wherein two conductors of the three conductors are located on opposite sides of the electronic circuit;

xxvi. the transmission device comprises an intermediate portion in which at least part of a first electric conductor of the transmission device and at least part of a second electric conductor of the transmission device are substantially parallel;

xxvii. the first waveguide comprises walls and extends along a longitudinal direction, wherein at least one of the walls comprises a first portion and a second portion, wherein for each plane orthogonal to the longitudinal direction in which the first portion is present, the first portion of the wall located in the plane protrudes inwardly towards the second waveguide with respect to the second portion of the wall located in the plane;

xxviii. the first portion extends, in a longitudinal direction, along a height of at least 0.621, wherein 21 is a central wavelength of the first frequency range;

xxix. a ratio between a lowest frequency of the second frequency range and a highest frequency of the first frequency range is equal to or greater than 2;

xxx. a maximal dimension of a cross section of an intermediate portion of the transmission device, located between the first waveguide and the third waveguide, is smaller than $\lambda_{max,\,HB}$, wherein $\lambda_{max,\,HB}$ corresponds to a maximal wavelength of the second frequency range;

xxxi. the transmission device comprises at least two electric conductors at least partially located within a third electric conductor; and xxxii. the transmission device comprises at least two electric conductors at least partially located on a third electric conductor.

According to another aspect of the presently disclosed subject matter there is provided an antenna comprising a diplexer as described above and a dish configured to reflect at least electromagnetic radiations falling in the first frequency range and electromagnetic radiations falling in the second frequency range towards the diplexer or transmitted by the diplexer.

In addition to the above features, the diplexer used in the antenna according to this aspect of the presently disclosed subject matter can optionally comprise one or more of features (i) to (xxxii) above, in any technically possible combination or permutation.

According to another aspect of the presently disclosed subject matter there is provided a method of operating a diplexer for an antenna, comprising receiving, by a transmission device comprising at least three electric conductors, electromagnetic radiations in a first frequency range and with at least one type of polarization from a third waveguide of the diplexer, transmitting, by the transmission device, electromagnetic radiations in the first frequency range and with the at least one type of polarization to a first waveguide of the diplexer, the first waveguide transmitting the electromagnetic radiations to a dual band port of the diplexer, and transmitting electromagnetic radiations in a second frequency range, higher than the first frequency range, from a high band port of the diplexer to the dual band port of the diplexer, using a second waveguide of the diplexer.

In addition to the above features, the diplexer used in the method according to this aspect of the presently disclosed subject matter can optionally comprise one or more of features (i) to (xxxii) above, in any technically possible combination or permutation.

According to another aspect of the presently disclosed subject matter there is provided a method of operating a diplexer for an antenna, comprising receiving, by a transmission device comprising at least three electric conductors, electromagnetic radiations in a first frequency range and with at least one type of polarization from a first waveguide of the diplexer, transmitting, by the transmission device, electromagnetic radiations in the first frequency range and with the at least one type of polarization to a third waveguide of the diplexer, the third waveguide transmitting the electromagnetic radiations to a low band port of the diplexer, and transmitting electromagnetic radiations in a second frequency range, higher than the first frequency range, from a dual band port of the diplexer to a high band port of the diplexer, using a second waveguide of the diplexer.

In addition to the above features, the diplexer used in the method according to this aspect of the presently disclosed subject matter can optionally comprise one or more of features (i) to (xxxii) above, in any technically possible combination or permutation.

According to some embodiments, the proposed solution provides an antenna which is operative in at least two different frequency ranges (high band signal and low band signal).

According to some embodiments, the proposed solution provides an antenna which is operative in at least two different frequency ranges, wherein these two different frequency ranges can be close one to the other.

According to some embodiments, the proposed solution provides a diplexer for an antenna in which coupling between a low band port and a high band port of the diplexer is reduced.

According to some embodiments, the proposed solution provides a diplexer for an antenna in which at least one parasitic electromagnetic mode, which can introduce perturbations, is reduced or removed. Therefore, energy is concentrated on the desired electromagnetic mode(s).

According to some embodiments, the proposed solution provides a diplexer for an antenna which maintains a desired type of polarization(s) of the electromagnetic waves.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION OF THE INVENTION

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

Figure 1:
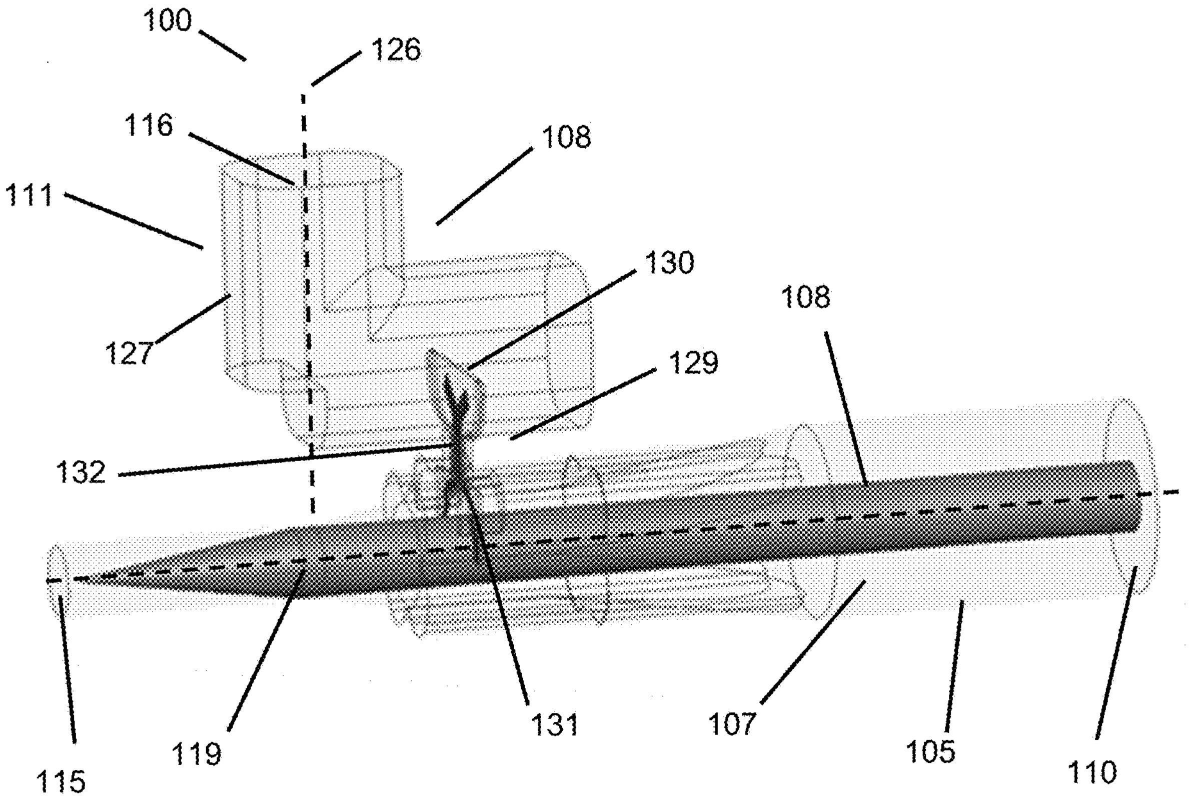
FIG. 1 illustrates an embodiment of a diplexer for an antenna.
Figure 2:
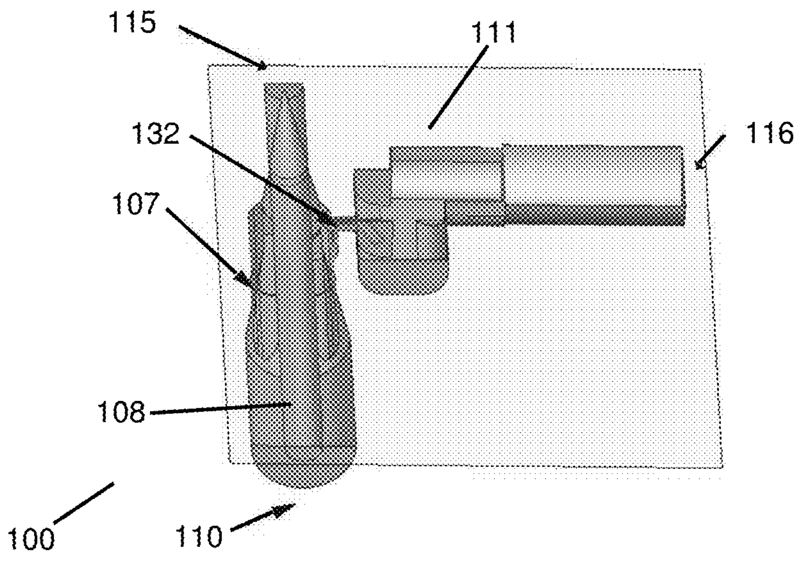
FIG. 2 is another view of the diplexer of FIG. 1.

FIGS. 1 and 2 illustrate a diplexer 100 (also called a "feed", or a "feed diplexer"). Diplexer 100 can be part of an antenna (not represented), such as a dish antenna. This is however not limitative. The antenna can be in particular a dual-band antenna.

Diplexer 100 includes a first waveguide 107 and a second waveguide 108 located within the first waveguide 107.

Thus, the first waveguide 107 corresponds to an external waveguide and the second waveguide 108 corresponds to an internal waveguide.

The second waveguide 108 has dimensions smaller than the thickness of the first waveguide 107.

According to some embodiments, both the first waveguide 107 and the second waveguide 108 extend along a longitudinal axis 119, as shown in FIG. 1.

According to some embodiments, the second waveguide 108 comprises a rod which is located within the first waveguide 107. In particular, the rod can be made of dielectric material, such as plastic. This is however not limitative.

Diplexer 100 includes a third waveguide 111. According to some embodiments, at least a portion 127 of the third waveguide 111 extends along a second axis 126, different from the longitudinal axis 119, as shown in FIG. 1. In some embodiments, the second axis 126 is orthogonal to the longitudinal axis 119. According to some embodiments, the third waveguide 111 can extend entirely along an axis parallel to the longitudinal axis 119. This is however not limitative.

A first end of the diplexer 100 corresponds to a dual band port 110. The dual band port 110 is located at an extremity of a structure 105 of the diplexer 100 which includes both the first waveguide 107 and the second waveguide 108.

Dual band port 110 can pass at least electromagnetic radiations falling in a first frequency range, and electromagnetic radiations falling in a second frequency range, wherein the second frequency range is higher than the first frequency range (therefore, generally, the second frequency range does not overlap with the first frequency range).

According to some embodiments, dual band port 110 can communicate e.g. with a reflector (not represented) of the antenna. This is however not limitative. The reflector can be part of a dish when the antenna is a dish antenna.

Non limitative examples of these ranges are as follows:

- the first frequency range is in the Ku Band (e.g. centre frequency of around 15 GHz) and the second frequency range is in the Ka Band (e.g. centre frequency of around 32 GHz);

the first frequency range is in a band of around 32 GHz (e.g. centre frequency of 32 GHZ) and the second frequency range is in a band of around 80 GHz (e.g. centre frequency of 80 GHz).

According to some embodiments, a ratio between a lowest frequency of the second frequency range and a highest frequency of the first frequency range and can be equal to or greater than 2.

Hereinafter, the first frequency range corresponds to a first wavelength range which can be written [$\lambda_{min, LB}$; $\lambda_{max, LB}$], wherein $\lambda_{max, LB}$ corresponds to the maximal wavelength of first frequency range and $\lambda_{min, LB}$ corresponds to the minimal wavelength of the first frequency range.

The central wavelength $\lambda_1$ is generally defined as $\lambda_1=(\lambda_{max, LB}+\lambda_{min, LB})/2$.

Similarly, the second frequency range corresponds to a second wavelength range which can be written [$\lambda_{min, HB}$; $\lambda_{max, HB}$], wherein $\lambda_{max, HB}$ corresponds to the maximal wavelength of the second frequency range and $\lambda_{min, HB}$ corresponds to the minimal wavelength of the second frequency range.

A second end of the diplexer 100 corresponds to a high band port 115. The high band port 115 is located at another extremity of the structure 105 of the diplexer 100 (opposite to the dual band port 110).

The high band port 115 is configured to receive or to transmit electromagnetic radiations falling in the second frequency range mentioned above.

A third end of the diplexer 100 corresponds to a low band port 116. The low band port 116 is located e.g. at an extremity of the third waveguide 111.

Electromagnetic radiations, which fall in the first frequency range, can be communicated (in at least one direction, or in two directions) between the third waveguide 111 and the first waveguide 107. In particular, and as further explained hereinafter, diplexer 100 includes a transmission device 129 (FIG. 1) configured to pass electromagnetic radiations falling in the first frequency range between the third waveguide 111 and the first waveguide 107.

According to some embodiments, for at least one type of polarization (e.g. linear, circular, etc.) the transmission device 129 is operative to pass electromagnetic radiations with the type of polarization from the third waveguide 111 to the first waveguide 107, or conversely. In other words, according to some embodiments, the transmission device 129 receives electromagnetic radiations with at least one given type of polarization from the third waveguide 111 (respectively from the first waveguide 107) and transmits electromagnetic radiations with this at least one given type of polarization to the first waveguide 107 (respectively to the third waveguide 111).

Assume that electromagnetic radiations with a linear polarization are present in the third waveguide 111 (respectively first waveguide 107). The transmission device 129 is operative to transmit, from the third waveguide 111 to the first waveguide 107 (respectively from the first waveguide 107 to the third waveguide 111) electromagnetic radiations which also have a linear polarization. In some embodiments, the direction of the linear polarization is maintained. For example, if a horizontal (respectively vertical) polarization is received by one end of transmission device, the transmission device 129 transmits also a horizontal (respectively vertical) polarization at its other end. This is however not limitative, and in some embodiments, the transmission device receives a horizontal polarization (respectively vertical polarization) and transmits a vertical polarization (respectively horizontal polarization).

Assume that electromagnetic radiations with two distinct orthogonal linear polarizations are present in the third waveguide 111 (respectively first waveguide 107). The transmission device 129 is operative to transmit, from the third waveguide 111 to the first waveguide 107 (respectively from the first waveguide 107 to the third waveguide 111) electromagnetic radiations with also two distinct orthogonal linear polarizations.

In other words, according to some embodiments, the transmission device 129 maintains the separation between the orthogonal polarizations between the third waveguide 111 and the first waveguide 107. In addition, according to some embodiments, the transmission device 129 is operative to maintain the frequency of the electromagnetic radiations which are passed between the third waveguide 111 and the first waveguide 107.

A circular polarization can be defined e.g. as the sum of two orthogonal linear polarizations, with an equal amplitude and a phase difference of 90 degrees.

As mentioned above, according to some embodiments, the transmission device 129 is operative to pass two distinct orthogonal linear polarizations between the third waveguide 111 and the first waveguide 107. Similarly, according to some embodiments, the transmission device 129 is operative to receive electromagnetic radiations with a circular polarization from the third waveguide 111 and to transmit electromagnetic radiations with a circular polarization to the first waveguide 107 (or conversely from the first waveguide 107 to the third waveguide 111). As mentioned above, the transmission device 129 receives and transmits electromagnetic radiations in the first frequency range.

In some embodiments, the sense of rotation of the circular polarization is maintained by the transmission device 129. For example, it receives electromagnetic radiations with a right circular polarization (respectively left circular polarization) from the third waveguide 111 and transmits electromagnetic radiations with a right circular polarization (respectively left circular polarization) to the first waveguide 107, or conversely. In other embodiments, the sense of rotation of the circular polarization is not maintained by the transmission device 129. For example, it receives electromagnetic radiations with a right circular polarization (respectively left circular polarization) from the third waveguide 111 and transmits electromagnetic radiations with a left circular polarization (respectively right circular polarization) to the first waveguide 107, or conversely.

An elliptical polarization can be defined e.g. as the sum of two orthogonal linear polarizations, with a different amplitude.

Therefore, according to some embodiments, the transmission device 129 is operative to receive electromagnetic radiations with an elliptical polarization from the third waveguide 111 and to transmit electromagnetic radiations with an elliptical polarization to the first waveguide 107 (or conversely from the first waveguide 107 to the third waveguide 111).

In some embodiments, the sense of rotation of the elliptical polarization is maintained by the transmission device 129. For example, it receives electromagnetic radiations with a right hand elliptical polarization (respectively left hand elliptical polarization) from the third waveguide 111 and transmits electromagnetic radiations with a right hand elliptical polarization (respectively left hand elliptical polarization) to the first waveguide 107, or conversely. In other embodiments, the sense of rotation of the elliptical polarization is not maintained by the transmission device 129. For example, it receives electromagnetic radiations with a right hand elliptical polarization (respectively left hand elliptical polarization) from the third waveguide 111 and transmits electromagnetic radiations with a left hand elliptical polarization (respectively right hand elliptical polarization) to the first waveguide 107, or conversely. As mentioned above, the transmission device 129 receives and transmits electromagnetic radiations in the first frequency range.

At least a first end 130 (FIG. 1) of the transmission device 129 is located within the third waveguide 111. According to some embodiments, the first end 130 of the transmission acts e.g. as a monopole/dipole or antenna within the third waveguide 111.

At least a second end 131 (FIG. 1) of the transmission device 129 is located within the first waveguide 107. According to some embodiments, the second end 131 of the transmission acts e.g. as a monopole/dipole or antenna within the first waveguide 107.

An intermediate portion 132 (also called a "transmission line") of the transmission device 129 is located between the third waveguide 111 and the first waveguide 107. In some embodiments, the intermediate portion 132 is located outside of the third waveguide 111 and the first waveguide 107.

As explained hereinafter, in some embodiments, the outer conductor of the intermediate portion 132 corresponds to a third conductor of the transmission device 129.

According to some embodiments, a maximal dimension of a cross section of the intermediate portion 132 is smaller than $\lambda_{max,\ HB}$. This is particularly beneficial to prevent energy of the electromagnetic radiations in the second frequency range to escape from the second waveguide to the third waveguide. This is however not limitative.

For example, if the intermediate portion 132 is cylindrical, the diameter of the cross-section of the cylinder (which is a circle) is smaller than $\lambda_{max,\ HB}$.

In another example, if a cross section of the intermediate portion 132 is a rectangle, the length of a diagonal of this rectangle is smaller than $\lambda_{max,\ HB}$.

According to some embodiments (see FIG. 1A), a minimal distance 170 between the transmission device 129 (that is to say the second end 131) and an external wall 171 of the second dielectric waveguide 108 is equal to or greater than $\lambda_{max,\ HB}/16$, wherein $\lambda_{max,\ HB}$ has been defined above. This is particularly beneficial to avoid interferences between electromagnetic radiations transmitted in the diplexer 100 in the first frequency range and electromagnetic radiations transmitted in the diplexer 100 in the second frequency range.

According to some embodiments, the second end 131 of the transmission device 129 (or at least part of it) has a semi-circular shape. This is also beneficial to reduce interferences, as mentioned above. This is however not limitative.

The third waveguide 111 can include an opening which enables insertion of the first end 130 (FIG. 1). Similarly, the first waveguide 107 can include an opening which enables insertion of the second end 131 (FIG. 1).

According to some embodiments, the transmission device 129 is located in a plane orthogonal to the longitudinal direction 119. This is however not limitative.

Figure 3:
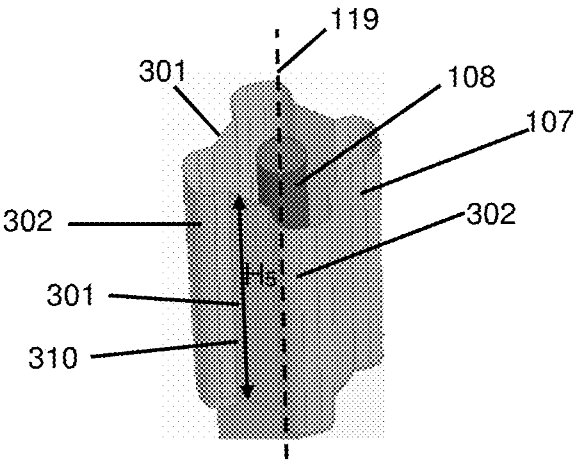
FIG. 3 illustrates an embodiment of a diplexer comprising a waveguide having at least one wall comprising a first portion which protrudes inwardly in a plane orthogonal to a longitudinal direction of this waveguide.

Attention is now drawn to FIG. 3.

According to some embodiments, the first waveguide 107 comprises at least one wall 310 which comprises a first portion 301 which protrudes inwardly towards the second waveguide 108 with respect to a second portion 302 of this wall.

The first portion 301 thus corresponds to an inwardly protruding side or edge of the wall.

Thus, a ridge waveguide 107 is obtained.

In particular, for each plane orthogonal to the longitudinal direction 119 in which the first portion 301 is present, the first portion 301 protrudes inwardly towards the second waveguide with respect to the second portion 302 located in this plane.

In the embodiment of FIG. 3, the first portion 301 is located in the central part of the wall 310, and the second portion 302 corresponds to the parts of the wall 310 which are located on each side of the first portion 301 (the central and side parts are defined in a plane parallel to the plane of the wall). This is however not mandatory.

According to some embodiments, the first portion 301 can extend (in a direction parallel to direction 119) along at least part of the first waveguide 107, or along the whole first waveguide 107.

According to some embodiments, the first portion 301 can extend, in the longitudinal direction 119, along a height $H_5$. According to some embodiments, $H_5$ is greater or equal to $0.6\lambda_1$ ($\lambda_1$ was defined previously). This is however not limitative.

Figure 3A:
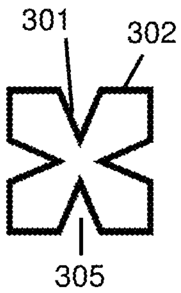
FIGS. 3A to 3E illustrate various non-limitative variants of the first portion of FIG. 3.
Figure 3B:
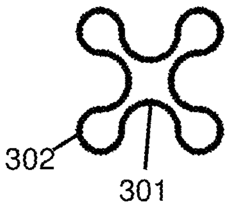
Figure 3C:
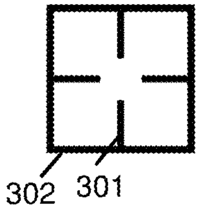
Figure 3D:
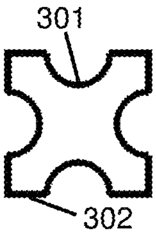
Figure 3E:
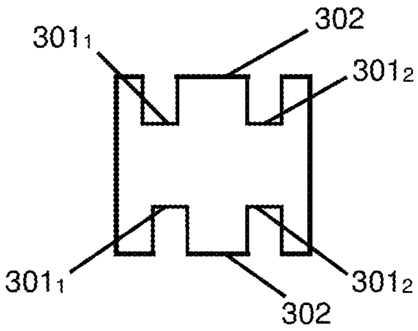

According to some embodiments, at least one wall of the first waveguide 107 can comprise at least two distinct first portions $\mathbf{301}_1$, $\mathbf{301}_2$ protruding inwardly, separated by a second portion 302 which does not protrude inwardly (see FIG. 3E, in which this configuration was illustrated for two opposite walls).

According to some embodiments, at least two walls (such as two opposite walls) of the first waveguide 107 each include a first portion 301 and a second portion 302 as described above.

According to some embodiments, at least three of the walls of the first waveguide 107 each comprises a first portion 301 and a second portion 302 as described above.

According to some embodiments, each of the four walls of the first waveguide 107 comprises a first portion 301 and a second portion 302 as described above.

The first portion 301 can be manufactured in different ways. According to some embodiments, a cavity is manufactured in the wall. According to some embodiments, the first portion is manufactured by: CNC, 3D printer, molding or extrusion. This is however not limitative.

Various shapes can be used for the first portion.

According to some embodiments, a cross-section of the first portion (e.g. in a plane orthogonal to the longitudinal axis 119) can have one of the following shapes (substantially or approximately):

- triangular shape (see FIG. 3A);
- curved shape (see FIG. 3B);
- linear shape (see FIG. 3C),
- a portion of a circle (see FIG. 3D), etc.

According to some embodiments, the first waveguide 107 is configured to communicate electromagnetic radiations (low band radiations) in a first electromagnetic mode and a second electromagnetic mode. The first and second electromagnetic modes correspond to the fundamental TE mode (one for each polarization) and are desired modes.

The presence of the first portion 301 in at least one wall can help to attenuate or cancel an undesired third electromagnetic mode (TM mode). Indeed, the third electromagnetic mode may alter the gain and performance of the antenna including the diplexer 100.

According to some embodiments, the presence of the first portion 301 does not affect the first and the second electromagnetic modes.

According to some embodiments, the first portion 301 delimits a cavity manufactured in the wall of the first waveguide 107 (see e.g. reference 305 in FIG. 3A, but this can apply to the other configurations as well).

According to some embodiments (see FIGS. 4A and 4B), the part of the wall of the first waveguide 107, at which the first portion is located, has an external surface which is substantially continuous (that is to say located in the same plane) with the external surface of the second portion. This is illustrated in the non-limitative examples of FIGS. 4A and 4B, in which an external surface 410 of the wall at which the first portion 401 is located and an external surface 411 of the second portion of the wall are in line, and constitute a single common external surface of the wall.

Figure 4A:
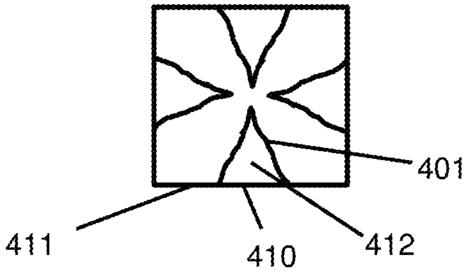
FIGS. 4A and 4B illustrate other non-limitative embodiments of the first portion of FIG. 3.
Figure 4B:
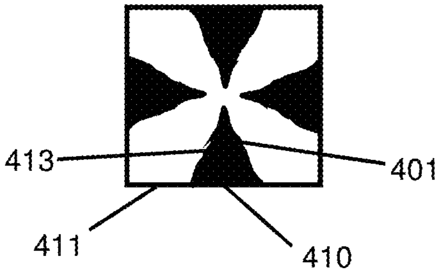

According to some embodiments, the first portion 401 can be a portion which is filled with material 413 (see FIG. 4B) or which delimits a cavity 412 (see FIG. 4A).

Figure 5:
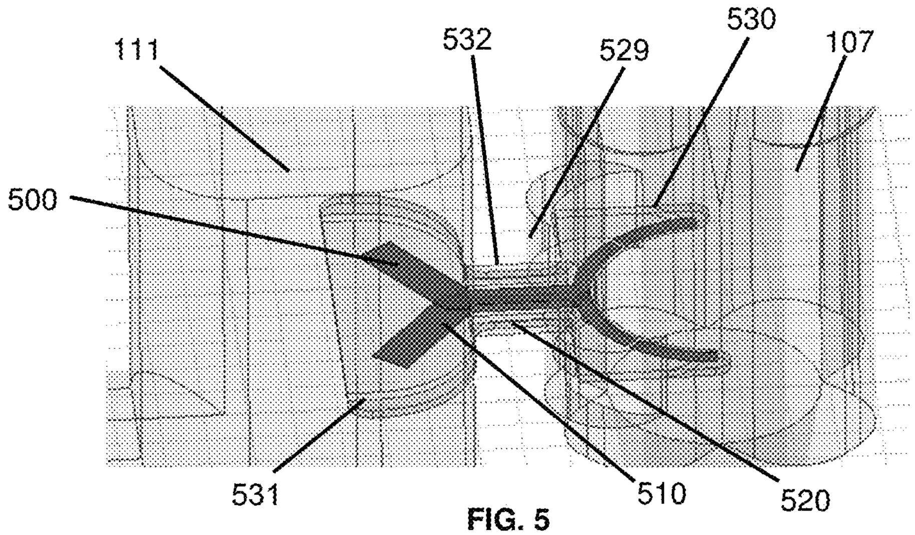
FIG. 5 illustrates an embodiment of a transmission device of the diplexer.

Attention is now drawn to FIG. 5, which depicts an embodiment of the transmission device 529 (referred to as 129 in FIG. 1).

The transmission device 529 includes at least three (distinct) electric conductors (hereinafter "conductors"). According to some embodiments, more than three conductors can be used (a non limitative example is provided hereinafter). In some embodiments, at least some of the conductors can be electrically connected one to the other.

In the embodiment of FIG. 5, the transmission device 529 includes a first conductor 500, a second conductor 510 and a third conductor 520. At least part of the first conductor 500 and at least part of the second conductor 510 are located within the third conductor 520 (also called a "shield")—in particular, the third conductor 520 includes an interior hollow in which the first conductor 500 and the second conductor 510 extend. In the embodiment of FIG. 5, a central portion of the first conductor 500 and a central portion of the second conductor 510 are located within the third conductor 520.

In this embodiment, a first end 530 of the transmission device 529 communicates with the first waveguide 107 (in particular, this first end 530 is located within the first waveguide 107) and a second end 531 of the transmission device 529 communicates with the third waveguide 111 (in particular, this second end 531 is located within the third waveguide 111). An intermediate portion 532 of the transmission device 529 is located between the first waveguide 107 and the third waveguide 111. This intermediate portion 532 is external to the first waveguide 107 and to the third waveguide 111. The third conductor 520 is located at this intermediate portion 532 and surrounds part of the first conductor 500 and part of the second conductor 510. In the intermediate portion 532, the first conductor 500 and the second conductor 510 are substantially parallel. In some embodiments, the third conductor 520 can be obtained by creating a cavity within a conductive (e.g. metallic) structure surrounding the first conductor 500 and the second conductor 510. The third conductor 520 can have various shapes, such as (but not limited to) a cylinder or a parallelepiped.

In some embodiments, the first conductor 500 and the second conductor 510 are conductors located (e.g. printed) on an electronic circuit (e.g. PCB). In some embodiments (see FIG. 5A), the first conductor 500 and the second conductor 510 are located on the same side of the electronic circuit.

In other embodiments (see FIG. 5B), the first conductor 500 and the second conductor 510 are located on opposite sides of the electronic circuit.

According to some embodiments (see FIG. 5A), an angle 545 between at least part of the first conductor 500 located in the first waveguide 107 (in this non limitative example, this corresponds to the first end/terminal portion 535 of the first conductor 500) and at least part of the second conductor 510 located in the first waveguide 107 (in this non limitative example, this corresponds to the first end/terminal portion 549$_1$ of the second conductor 510) is above a threshold. In some embodiments, the threshold is equal to 10 degrees. This is however not limitative.

In other words, at least part of the first conductor 500 and the second conductor 510 located in the first waveguide 107 move away one from the other. In some embodiments, the first conductor 500 and the second conductor 510 are not parallel in the first waveguide 107.

Similarly (see FIG. 5B), according to some embodiments, an angle 565 between at least part of the first conductor 500 located in the third waveguide 111 (in this non limitative example, this corresponds to the second end/terminal portion 570 of the first conductor 500) and at least part of the second conductor 510 located in the third waveguide 111 (in this non limitative example, this corresponds to the second end/terminal portion 567 of the second conductor 510) is above a threshold. In some embodiments, the threshold is equal to 10 degrees. This is however not limitative.

In other words, at least part of the first conductor 500 and the second conductor 510 located in the third waveguide 111 move away, one from the other. In some embodiments, the first conductor 500 and the second conductor 510 are not parallel in the third waveguide 111.

Figure 5A:
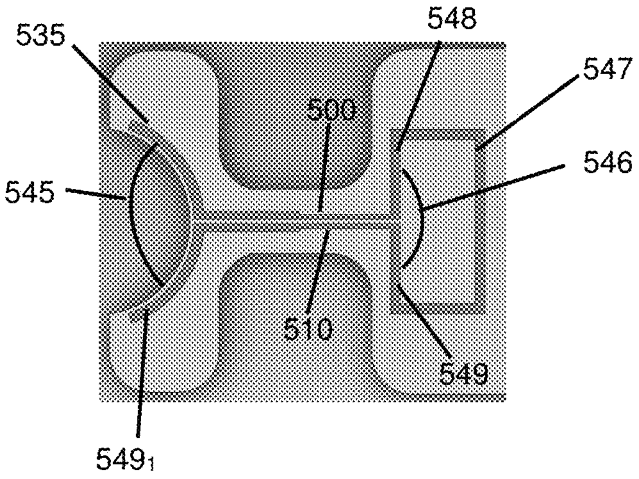
FIG. 5A illustrates another embodiment of a transmission device of the diplexer.
Figure 5B:
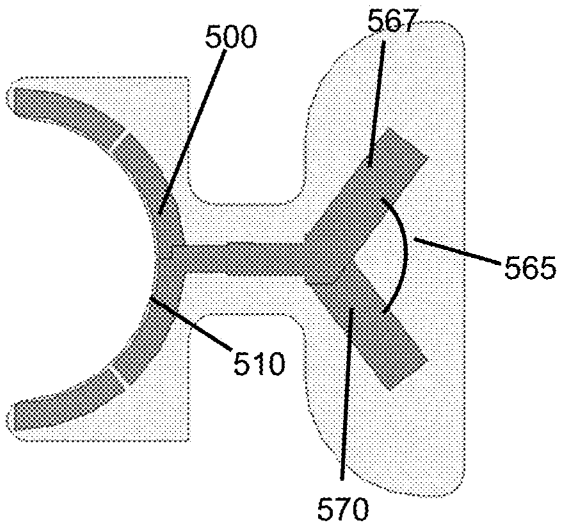
FIG. 5B illustrates an embodiment of a transmission device of the diplexer, similar to FIG. 5.

In the embodiment of FIG. 5A, a second part 548 of the first conductor 500 and a second part 549 of the second conductor 510 located in the third waveguide 111 move away, one from the other (see angle 546, which is approximately equal to 180 degrees). A difference between the embodiment of FIG. 5A and the embodiment of FIG. 5B is that in the embodiment of FIG. 5A the terminal portions of the first conductor 500 and of the second conductor 510 are electrically connected (see electrical connection 547 in FIG. 5A).

Figure 5C:
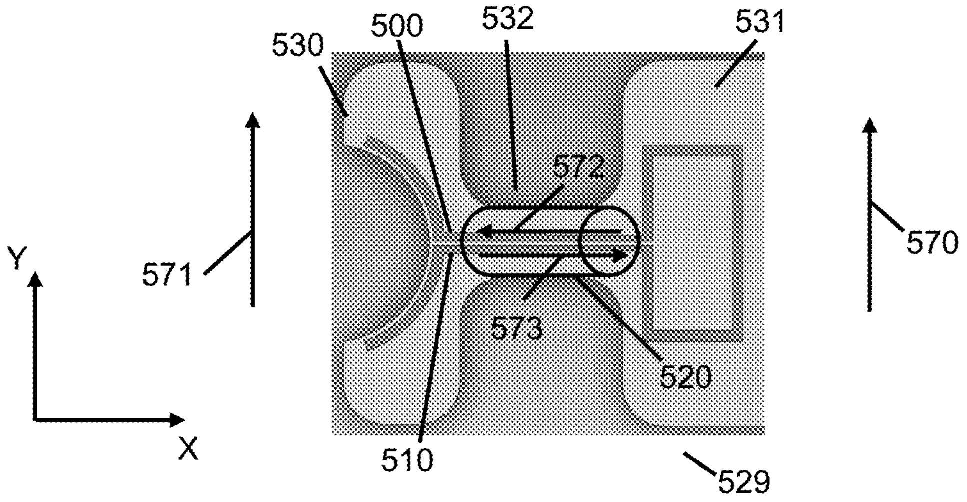
FIG. 5C illustrates an embodiment of an operation of a transmission device.

Attention is now drawn to FIG. 5C.

Assume now that electromagnetic radiations 570 with a first (linear) polarization (along a first direction) are communicated in the third waveguide 111.

Assume that the first conductor 500 and the second conductor 510 extend, in the intermediate portion 532 of the transmission device 529, along a main direction "X".

The first polarization can correspond to a polarization orthogonal to this main direction X (that is to say along axis Y). In some embodiments, depending on the spatial orientation of the diplexer (or of the antenna including the diplexer), this can correspond to a vertical polarization.

As mentioned above, electromagnetic radiations 570 in the third waveguide 111 are in the first frequency range (low frequency range).

Electromagnetic radiations 570 induce creation of electric currents in the first conductor 500 and in the second conductor 510. In particular, at least part of the first conductor 500 and of the second conductor 510 operate in an electric mode called a "odd mode" (also called a "differential mode"). In the odd mode, a first current 572 in the first conductor 500 and a second current 573 in the second conductor 510 propagate along opposite directions. In particular, in the intermediate portion 532 of the transmission device 529, the first current 572 in the first conductor 500 and the second current 573 in the second conductor 510 propagate along opposite directions.

According to some embodiments, in this configuration, there is no electric current (or a minimal electric current) in the third conductor 520.

At the first end 530 of the transmission device 529 which is located in the first waveguide 107, electromagnetic radiations 571 with also a linear polarization are generated by the transmission device 529 (in particular by the terminal portion 530 which includes terminal portions of the first and second conductors 500, 510 acting as a dipole) and transmitted in the first waveguide 107. In addition, electromagnetic radiations 571 are also located in the first frequency range.

Figure 5D:
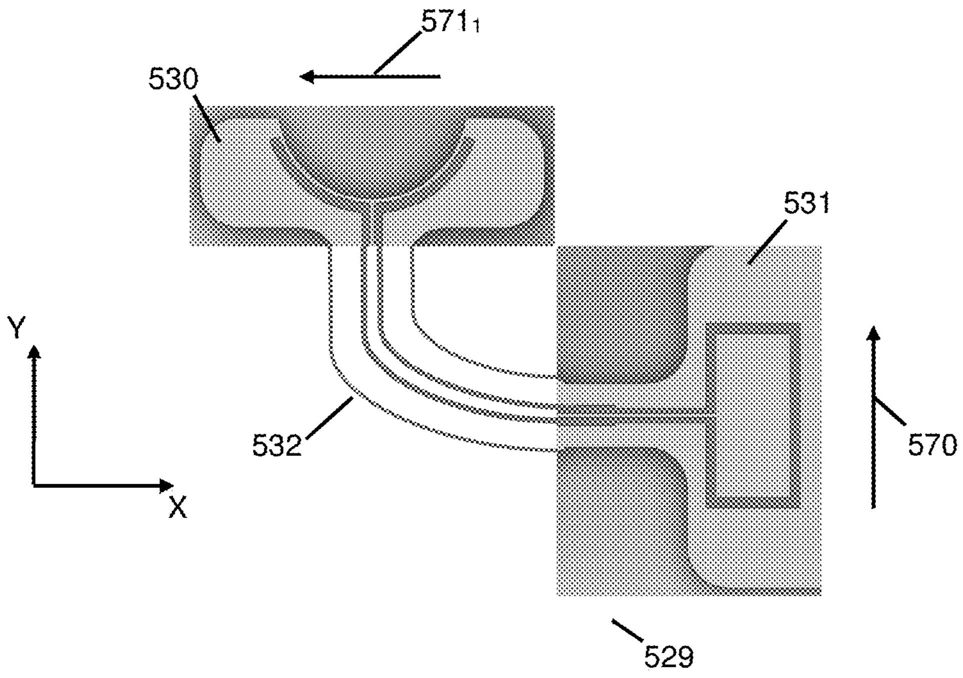
FIG. 5D illustrates another embodiment of an operation of a transmission device.

In the non limitative example of FIG. 5C, electromagnetic radiations 571 transmitted by the transmission device 529 have the same linear polarization (first linear polarization) as the electromagnetic radiations 570. This is however not limitative. As shown in the embodiment of FIG. 5D, in some embodiments, electromagnetic radiations $\mathbf{571}_1$ transmitted by the transmission device 529 have a linear polarization with is orthogonal to the first linear polarization of the electromagnetic radiations 570. In the non-limitative example of FIG. 5D, this is due to the fact that the intermediate portion 532 of the transmission device 529 extends along a curved trajectory (therefore, the first end 530 is orthogonal to the second end 531).

Operations described above correspond to a configuration in which the diplexer of the antenna operates in transmission.

A similar operation occurs when the diplexer 100 of the antenna operates in reception, as explained hereinafter.

Assume now that electromagnetic radiations 571 with a first (linear) polarization are communicated in the third waveguide 111. As mentioned above, the first linear polarization can be orthogonal to the main direction X along which the first conductor 500 and the second conductor 510 extend in the intermediate portion 532 of the transmission device 529.

As mentioned above, electromagnetic radiations 571 in the first waveguide 107 are in the first frequency range (low frequency range).

Electromagnetic radiations 571 induce that at least part of the first conductor 500 and of the second conductor 510 operate in the "odd mode". In the odd mode, in the intermediate portion 532 of the transmission device 529, the first current 572 in the first conductor 500 and the second current 573 in the second conductor 510 propagate along opposite directions. According to some embodiments, in this configuration, there is no electric current (or a minimal electric current) in the third conductor 520.

At the second end 531 of the transmission device 529 which is located in the third waveguide 111, electromagnetic radiations 570 with a linear polarization are generated by the transmission device 529 (in particular by its terminal portion 531 which includes terminal portions of the first and second conductors 500, 510 acting as a dipole) and transmitted in the third waveguide 111. In addition, electromagnetic radiations 570 are also located in the first frequency range.

In other words, the transmission device 529 is operative to receive electromagnetic radiations with a first linear polarization from the third waveguide 111 and to transmit electromagnetic radiations with also a linear polarization to the first waveguide 107, or conversely (using an odd mode in conductors of the transmission device 529), while maintaining frequency of the electromagnetic radiations in the first frequency range. In some embodiments, the direction of the first linear polarization and the direction of the linear polarization are the same (see FIG. 5C) and in other embodiments (see FIG. 5D), the direction of the first linear polarization and the direction of the linear polarization are different (in the example of FIG. 5D, an angle of 90 degrees is present between the two directions, this is however not limitative and an angle with another value can be present, depending e.g. on the level of curvature of the intermediate portion of the transmission device 529).

Figure 5E:
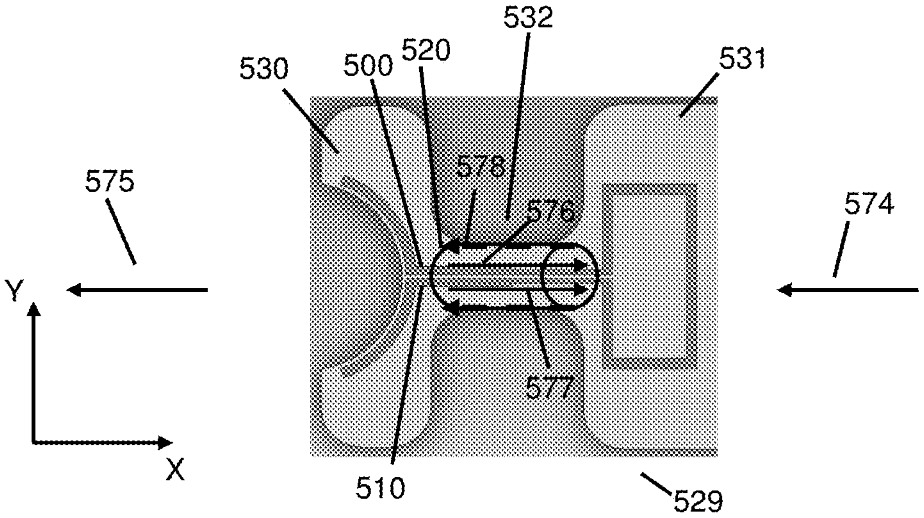
FIG. 5E illustrates another embodiment of an operation of a transmission device.

Attention is now drawn to FIG. 5E.

Assume that electromagnetic radiations 574 with a second (linear) polarization (different from the first polarization mentioned above) are communicated in the third waveguide 111.

According to some embodiments, the second polarization is orthogonal to the first polarization.

According to some embodiments, the second polarization is along a direction substantially parallel to a direction (axis X) along which the two conductors 500, 510 extend in the intermediate portion 532 of the transmission device 529. In some embodiments, depending on the spatial orientation of the diplexer (or of the antenna including the diplexer), this can correspond to a horizontal polarization.

As mentioned above, electromagnetic radiations 574 in the third waveguide 111 are in the first frequency range (low frequency range).

Electromagnetic radiations 574 induce creation of electric currents in the first conductor 500, the second conductor 510 and the third conductor 520. In particular, at least part of the first conductor 500 and the second conductor 510 operate in an electric mode called an "even mode" (also called a "common mode"). In the even mode, a first current 576 in the first conductor 500 and a second current 577 in the second conductor 510 propagate along the same directions. In particular, in the intermediate portion 532 of the transmission device 529, the first current 576 in the first conductor 500 and the second current 577 in the second conductor 510 propagate along the same directions.

In addition, in this configuration, an electric current 578 is generated in the third conductor 520. The electric current 578 has a direction which is opposite to the direction of the first current 576 and the second current 577.

At the first end 530 of the transmission device 529 which is located in the first waveguide 107, electromagnetic radiations 575 with a linear polarization are generated by the transmission device 529 (in particular by its terminal portion 530 which includes terminal portions of the first and second conductors 500, 510 acting as a monopole) and transmitted in the first waveguide 107. In addition, electromagnetic radiations 575 are also located in the first frequency range.

Figure 5F:
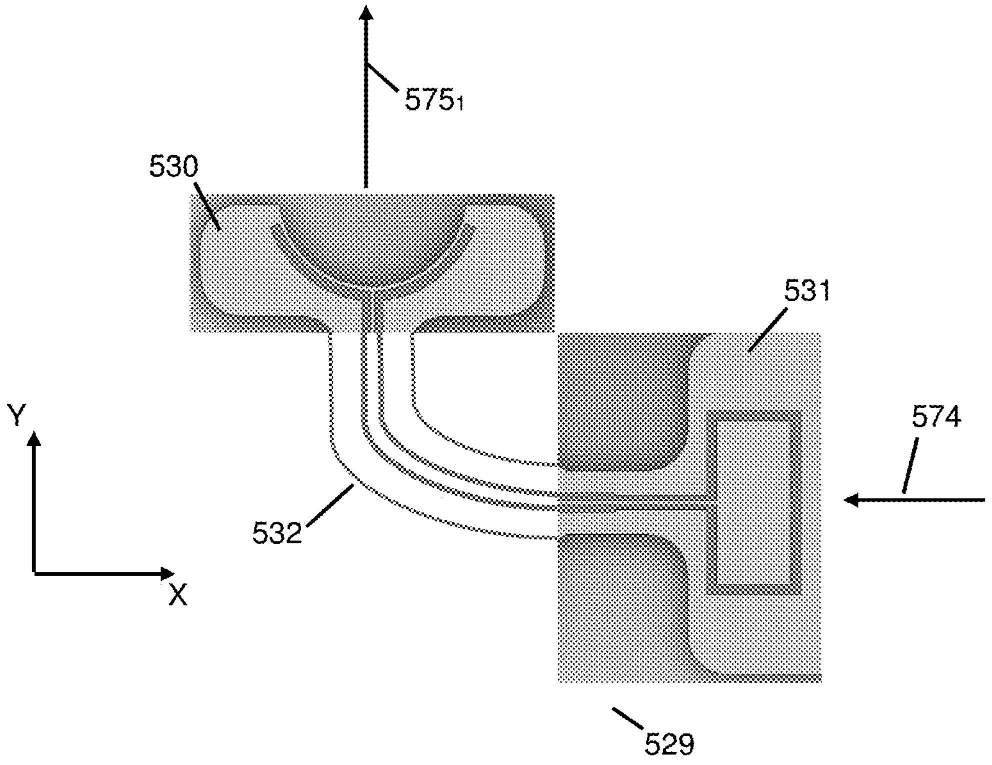
FIG. 5F illustrates another embodiment of an operation of a transmission device.

In the non limitative example of FIG. 5E, electromagnetic radiations 575 transmitted by the transmission device 529 have the same linear polarization (second linear polarization) as the electromagnetic radiations 574. This is however not limitative. As shown in the embodiment of FIG. 5F, in some embodiments, electromagnetic radiations $\mathbf{575}_1$ transmitted by the transmission device 529 have a linear polarization with is orthogonal to the second linear polarization of the electromagnetic radiations 574. In the non-limitative example of FIG. 5F, this is due to the fact that the intermediate portion 532 of the transmission device 529 extends along a curved trajectory (therefore, the first end 530 is orthogonal to the second end 531).

Operations described above correspond to a configuration in which the diplexer of the antenna operates in transmission.

A similar operation occurs when the diplexer 100 of the antenna operates in reception, as explained hereinafter.

Assume now that electromagnetic radiations 575 with a second (linear) polarization are communicated in the first waveguide 107. As mentioned above, the second linear polarization can be substantially parallel to the main direction X along which the first conductor 500 and the second conductor 510 extend (at least partially) in the intermediate portion 532 of the transmission device 529.

As mentioned above, electromagnetic radiations 575 in the first waveguide 107 are in the first frequency range (low frequency range).

Electromagnetic radiations 575 induce that at least part of the first conductor 500 and of the second conductor 510 operate in the "even mode". In the even mode, a first current 576 in the first conductor 500 and a second current 577 in the second conductor 510 propagate along the same directions. An electric current 578 is generated in the third conductor 520, which has a direction which is opposite to the direction of the first current 576 and the second current 577.

At the second end 531 of the transmission device 529 which is located in the third waveguide 111, electromagnetic radiations 574 with a linear polarization are generated by the transmission device 529 (in particular by the terminal portion 531 which includes terminal portions of the first and second conductors 500, 510 acting as a dipole) and transmitted in the third waveguide 111. In addition, electromagnetic radiations 574 are also located in the first frequency range.

In other words, the transmission device 529 is operative to receive electromagnetic radiations with a second linear polarization from the third waveguide 111 and to transmit electromagnetic radiations with also a linear polarization to the first waveguide 107, or conversely (using an even mode in conductors of the transmission device 529).

In some embodiments, the direction of the second linear polarization and the direction of the linear polarization are the same (see FIG. 5E) and in other embodiments (see FIG. 5F), the direction of the second linear polarization and the direction of the linear polarization are different (in the example of FIG. 5F, an angle of 90 degrees is present between the two directions, this is however not limitative and an angle with another value can be present, depending e.g. on the level of curvature of the intermediate portion of the transmission device 529).

Figure 5G:
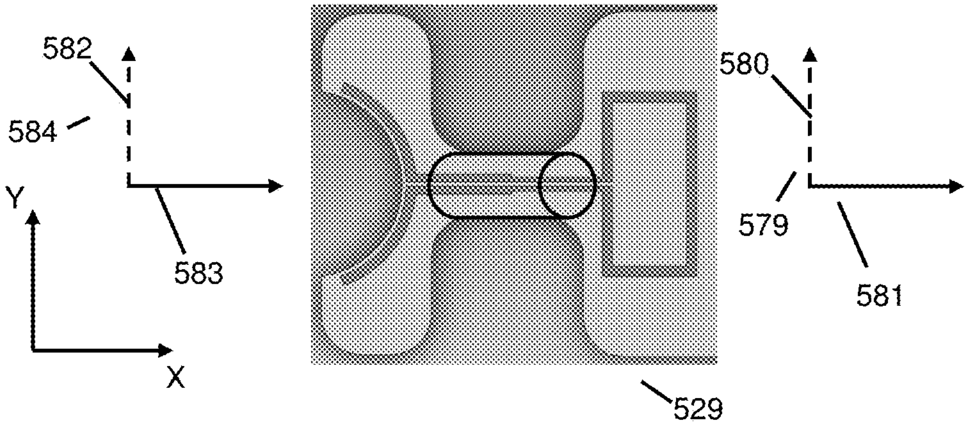
FIG. 5G illustrates another embodiment of an operation of a transmission device.
Figure 5H:
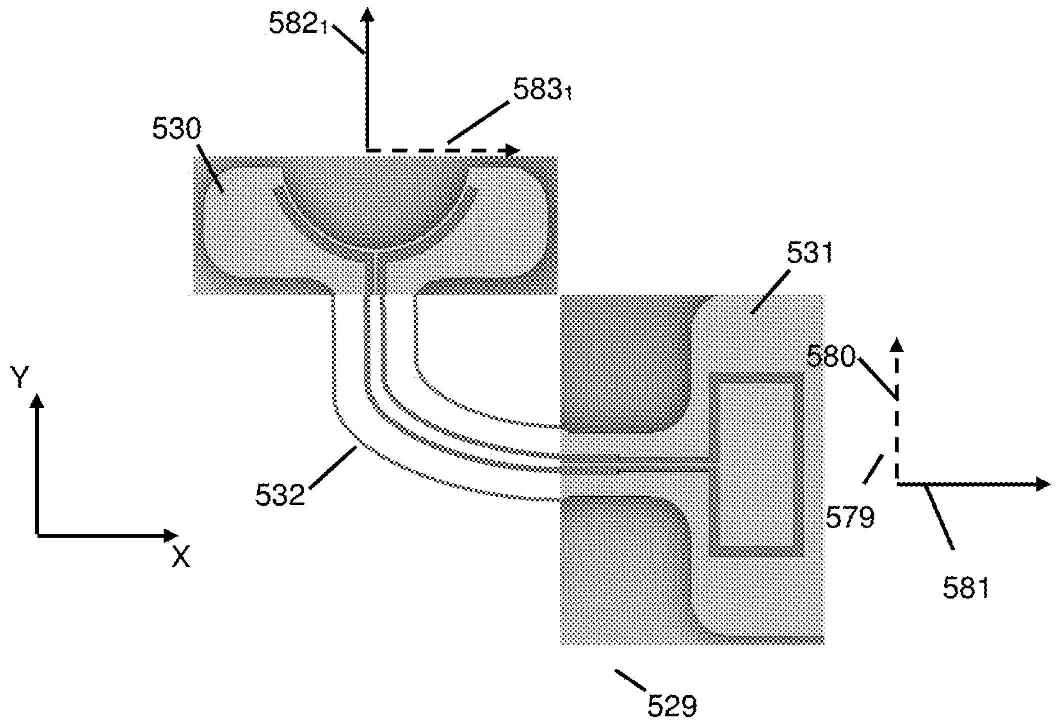
FIG. 5H illustrates another embodiment of an operation of a transmission device.

Attention is now drawn to FIG. 5H.

According to some embodiments, assume that electromagnetic radiations 579 with both a first (linear) polarization 580 and a second (linear) polarization 581 (orthogonal to the first polarization 580) are communicated in the third waveguide 111.

In some embodiments, the first polarization 580 is orthogonal to a direction X along which the two conductors extend in the intermediate portion 532 of the transmission device 529, and the second polarization 581 is substantially parallel to this direction X.

As mentioned above, electromagnetic radiations 579 in the third waveguide 111 are in the first frequency range (low frequency range).

The transmission device 529 is operative to transmit electromagnetic radiations 584 in the first waveguide 107, with both the same first polarization (see the direction of the linear polarization 582 which is identical to the direction of the linear polarization 580) and the same second polarization (see the direction of the linear polarization 583 which is identical to the direction of the linear polarization 581).

Each polarization is transmitted as explained above (see FIG. 5C and FIG. 5F), using respectively an odd mode and an even mode (which can simultaneously be present in the transmission device). FIG. 5G does not illustrate distribution of the electric currents. According to some embodiments, the two orthogonal polarizations (first and second linear polarizations) can be transmitted simultaneously.

Similarly, when the antenna operates in reception, the transmission device 529 is operative to receive electromagnetic radiations 584 (see FIG. 5G) from the first waveguide 107 (electromagnetic radiations 584 having a first polarization 582 and a second different polarization 583—see FIG. 5G) and to transmit in the third waveguide 111 electromagnetic radiations 579 with both the same first polarization 580 and the same second polarization 581.

In the non limitative example of FIG. 5G, the first polarization 580 in the third waveguide induces creation of the first polarization 582 in the first waveguide (or conversely), and the second polarization 581 in the third waveguide induces creation of the second polarization 583 in the first waveguide (or conversely). This is however not limitative.

In other embodiments (see FIG. 5H), the first polarization 580 in the third waveguide induces creation of the second polarization $\mathbf{583}_1$ (orthogonal to the first polarization 580) in the first waveguide (or conversely), and the second polarization 581 in the third waveguide induces creation of the first polarization $\mathbf{582}_1$ (orthogonal to the second polarization 581) in the first waveguide (or conversely). This is however not limitative.

In other words, the transmission device 529 is operative to receive electromagnetic radiations with two orthogonal polarizations from the third waveguide 111 and to transmit electromagnetic radiations with two orthogonal polarizations in the first waveguide 107, or conversely, while maintaining frequency of the electromagnetic radiations in the first frequency range.

In some embodiments, the directions of the two orthogonal polarizations received by the transmission device 529 can be identical to the directions of the two orthogonal polarizations transmitted by the transmission device 529. In other embodiments, the directions of the two orthogonal polarizations received by the transmission device 529 can be different from the directions of the two orthogonal polarizations transmitted by the transmission device 529 (e.g. by using a transmission device as in FIG. 5H but with a different level of curvature of the intermediate portion 532, which does not make a 90 degrees turn).

According to some embodiments, the transmission device 529 is operative to receive electromagnetic radiations with a circular polarization from the third waveguide 111 and to transmit electromagnetic radiations with a circular polarization to the first waveguide 107 (or conversely).

According to some embodiments, the transmission device 529 is operative to receive electromagnetic radiations with an elliptical polarization from the third waveguide 111 and to transmit electromagnetic radiations with an elliptical polarization to the first waveguide 107 (or conversely).

Figure 6:
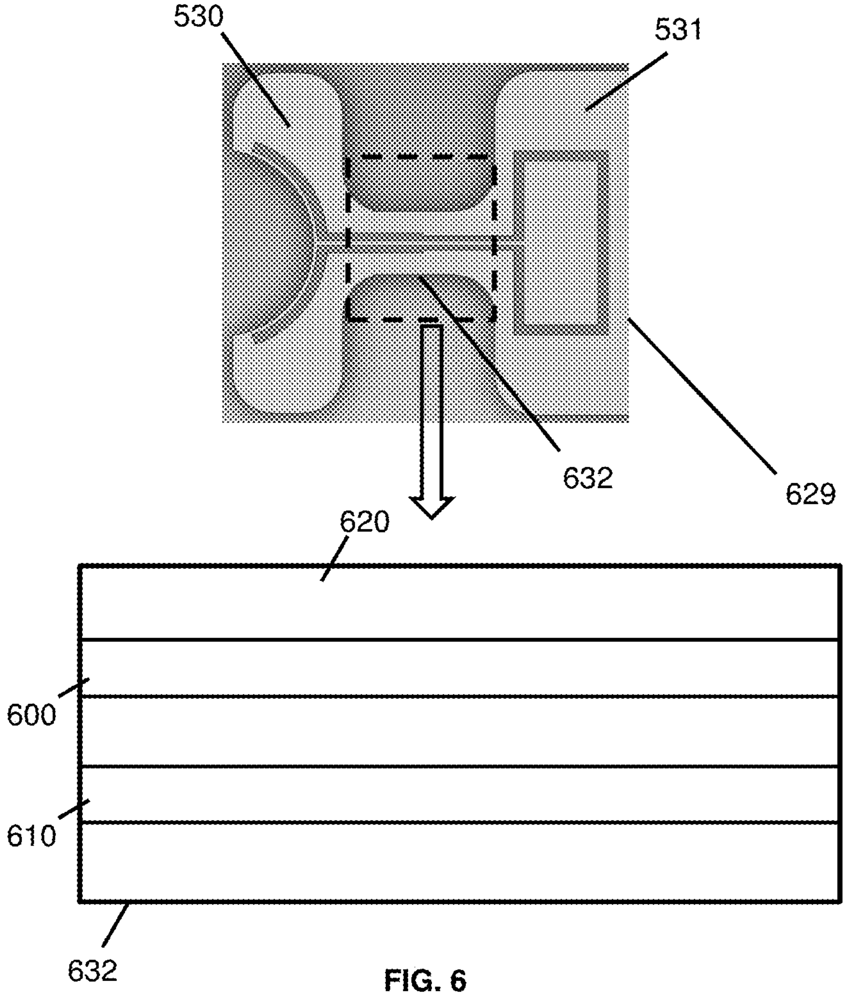
FIG. 6 illustrates another embodiment of the transmission device of the diplexer.

Attention is now drawn to FIG. 6, which depicts a variant of the intermediate portion (referred to as 632) of the transmission device (referred to as 629). The first end 530 and the second end 531 of the transmission device 629 can be similar to the embodiments described above (see e.g. FIGS. 5, 5A to 5E).

In this embodiment, the intermediate portion 632 of the transmission device 629 includes a first conductor 600, a second conductor 610, and a third conductor 620. The third conductor 620 acts as a ground plane. The first conductor 600 and the second conductor 610 are located e.g. on an electronic circuit (PCB). The first conductor 600 and the second conductor 610 can correspond e.g. to stripline conductors. In some embodiments, the first conductor 600 and the second conductor 610 are, at least partially, substantially parallel within the intermediate portion 632.

According to some embodiments, dielectric material is present between the electronic circuit on which the first conductor 600 and the second conductor 610 are located, and the third conductor 620. This is however not mandatory, and air can be present between the electronic circuit and the third conductor 620.

Operation of the transmission device 629 including the intermediate portion 632 of FIG. 6 is similar to operation of the transmission device 529 as described with respect to FIGS. 5, 5A to 5E.

Figure 6A:
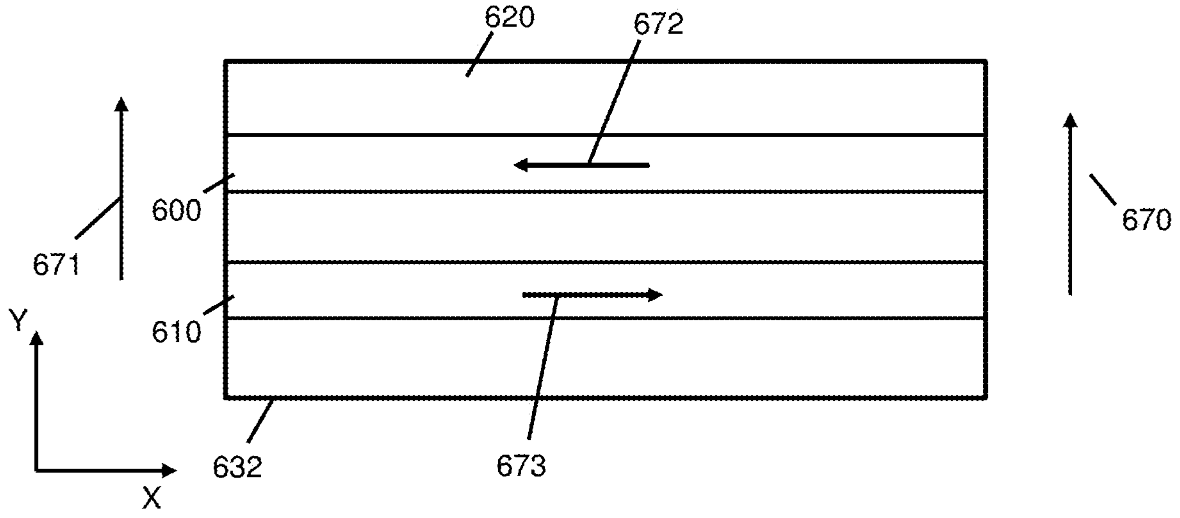
FIG. 6A illustrates an embodiment of an operation of the transmission device of FIG. 6.

As shown in FIG. 6A, electromagnetic radiations 670 with a first (linear) polarization (e.g. orthogonal to the main direction X along which the first conductor 600 and the second conductor 610 extend in the intermediate portion 632) induce that at least part of the first conductor 600 and of the second conductor 610 operate in the odd mode. In particular, in the intermediate portion 632 (visible in FIGS. 6 and 6A) of the transmission device 629, a first electric current 672 (visible in FIG. 6A) in the first conductor 600 and a second electric current 673 (visible in FIG. 6A) in the second conductor 610 propagate along opposite directions. According to some embodiments, in this configuration, there is no electric current (or a minimal electric current) in the third conductor 620.

At the first end 530 of the transmission device 629 which is located in the first waveguide 107, electromagnetic radiations 671 with a linear polarization are generated by the transmission device 629 (in particular by the terminal portion 530 which includes terminal portions of the first and second conductors 600, 610 acting as a dipole) and transmitted in the first waveguide 107. In addition, electromagnetic radiations 671 are also located in the first frequency range.

Similarly, when the antenna operates in reception, electromagnetic radiations 671 with the first linear polarization in the first waveguide 107 can be received by the transmission device 629 which in turn transmits electromagnetic radiation 670 with a linear polarization (using an odd mode in the first and second conductors 600, 610).

In the non-limitative example of FIG. 6A, the direction of the linear polarization of electromagnetic radiations 671 is the same as the direction of the linear polarization of electromagnetic radiations 670. As mentioned above, this is not limitative, and in some embodiments, the direction of the linear polarization of electromagnetic radiations 671 can be orthogonal to the direction of the linear polarization of electromagnetic radiations 670 (see e.g. architecture of FIG. 5D, which can be also used with the transmission device 629).

Figure 6B:
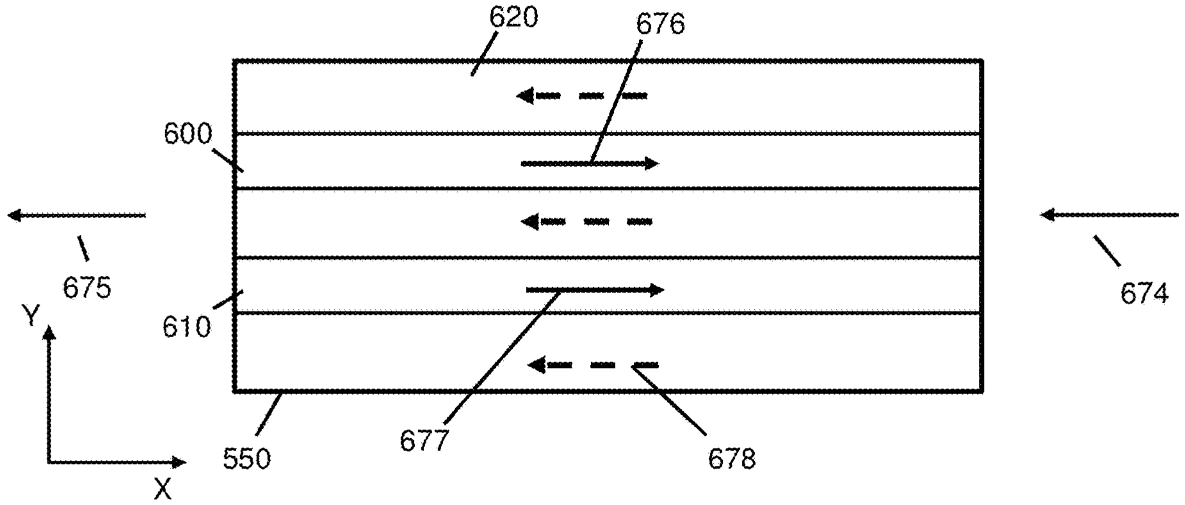
FIG. 6B illustrates another embodiment of an operation of the transmission device of FIG. 6.

Attention is drawn to FIG. 6B.

Electromagnetic radiations 674 with a second (linear) polarization (e.g. substantially parallel to the main direction X along which the first conductor 600 and the second conductor 610 extend in the intermediate portion 550) induce that at least part of the first conductor 600 and of the second conductor 610 operate in the even mode. In particular, in the intermediate portion 550 of the transmission device 629, the first current 676 in the first conductor 600 and the second current 677 in the second conductor 610 propagate along the same directions. In addition, an electric current 678 is generated in the third conductor 620. The electric current 678 has a direction which is opposite to the direction of the first current 676 and the second current 677.

At the first end 530 of the transmission device 629 which is located in the first waveguide 107, electromagnetic radiations 675 with a linear polarization are generated by the transmission device 629 (in particular by the terminal portion 530 which includes terminal portions of the first and second conductors 600, 610 acting as a monopole) and transmitted in the first waveguide 107. In addition, electromagnetic radiations 675 are also located in the first frequency range.

Similarly, when the antenna operates in reception, electromagnetic radiations 675 with the second polarization in the first waveguide 107 can be received by the transmission device 629, which, in turn, transmits electromagnetic radiation 674 with a linear polarization (using an even mode in the first and second conductors 600, 610, and an opposite current in the third conductor 620).

In the non-limitative example of FIG. 6B, the direction of the linear polarization of electromagnetic radiations 674 is the same as the direction of the linear polarization of electromagnetic radiations 675. As mentioned above, this is not limitative, and in some embodiments, the direction of the linear polarization of electromagnetic radiations 674 can be different from the direction of the linear polarization of electromagnetic radiations 675 (see e.g. architecture of FIG. 5F, which can be used also herein—as mentioned above, the angle between the two directions of the polarizations can be different from 90 degrees).

According to some embodiments, the transmission device 629 is operative to receive electromagnetic radiations with two orthogonal polarizations from the third waveguide 111 and to transmit electromagnetic radiations with two orthogonal polarizations in the first waveguide 107, or conversely, while maintaining frequency of the electromagnetic radiations in the first frequency range. As mentioned above, the directions of the two orthogonal polarizations received by the transmission device 629 can be different from the directions of the two orthogonal polarizations transmitted by the transmission device 629.

In some embodiments, the transmission device 629 is operative to receive electromagnetic radiations with a circular polarization from the third waveguide 111 and to transmit electromagnetic radiations with a circular polarization to the first waveguide 107 (or conversely).

In some embodiments, the transmission device 629 is operative to receive electromagnetic radiations with an elliptical polarization from the third waveguide 111 and to transmit electromagnetic radiations with an elliptical polarization to the first waveguide 107 (or conversely).

Figure 7:
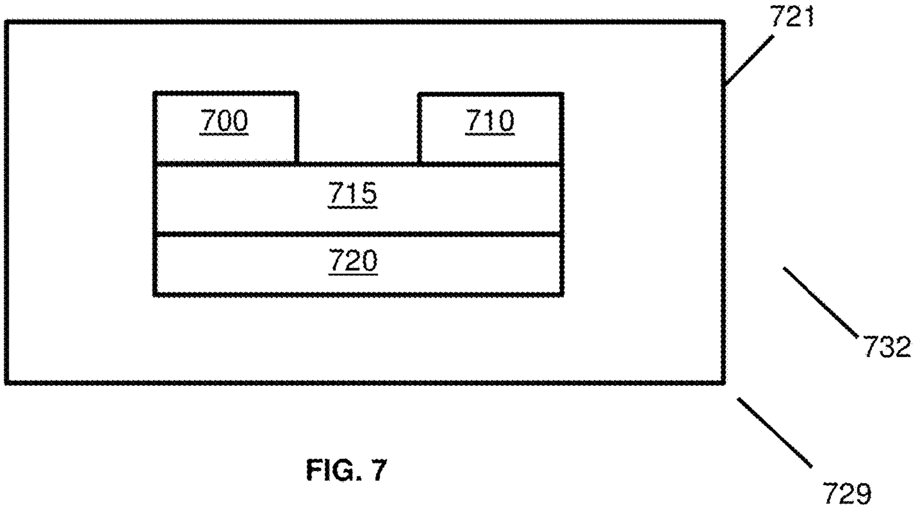
FIG. 7 illustrates a side view of another embodiment of the transmission device which includes more than three electric conductors.

Attention is now drawn to FIG. 7.

In FIG. 7, a non limitative example of a transmission device 729 including more than three electric conductors (in this example four electric conductors) is depicted.

FIG. 7 depicts a side view of an intermediate portion 732 of the transmission device 729 (this intermediate portion 732 is located between the third waveguide 111 and the first waveguide 107, similarly to the intermediate portion 132 visible in FIGS. 1 and 2, the intermediate portion 532 visible in FIGS. 5, 5C, 5D, 5E, 5F and 5H or the intermediate portion 632 visible in FIGS. 6 and 6A).

The first end and the second end of the transmission device 729 can be similar to the embodiments described above (see e.g. reference 530 for the first end and reference 531 for the second end in FIGS. 5 to 5E).

In this embodiment, the intermediate portion 732 of the transmission device 729 includes a first conductor 700, a second conductor 710 and a third conductor 720. The third conductor 720 acts as a ground plane. The first conductor 700 and the second conductor 710 are located e.g. on an electronic circuit (PCB). The first conductor 700 and the second conductor 710 can correspond e.g. to stripline conductors. In some embodiments, the first conductor 700 and the second conductor 710 are, at least partially, substantially parallel within the intermediate portion 732.

According to some embodiments, the first conductor 700, the second conductor 710 and the third conductor 720 are present in the first end of the transmission device 729 located in the first waveguide 107, in the intermediate portion 732 of the transmission device 729 and in the second end of the transmission device 729 located in the third waveguide 111.

According to some embodiments, dielectric material 715 is present between the electronic circuit on which the first conductor 700 and the second conductor 710 are located, and the third conductor 720. This is however not mandatory, and air can be present between the electronic circuit and the third conductor 720.

The transmission device 729 includes a fourth electric conductor 721. In the embodiment of FIG. 7, at least part of the first conductor 700, the second conductor 710 and the third conductor 720 are located within the fourth electric conductor 721. The fourth electric conductor 721 is present between the first waveguide 107 and the third waveguide 111.

Figure 7A:
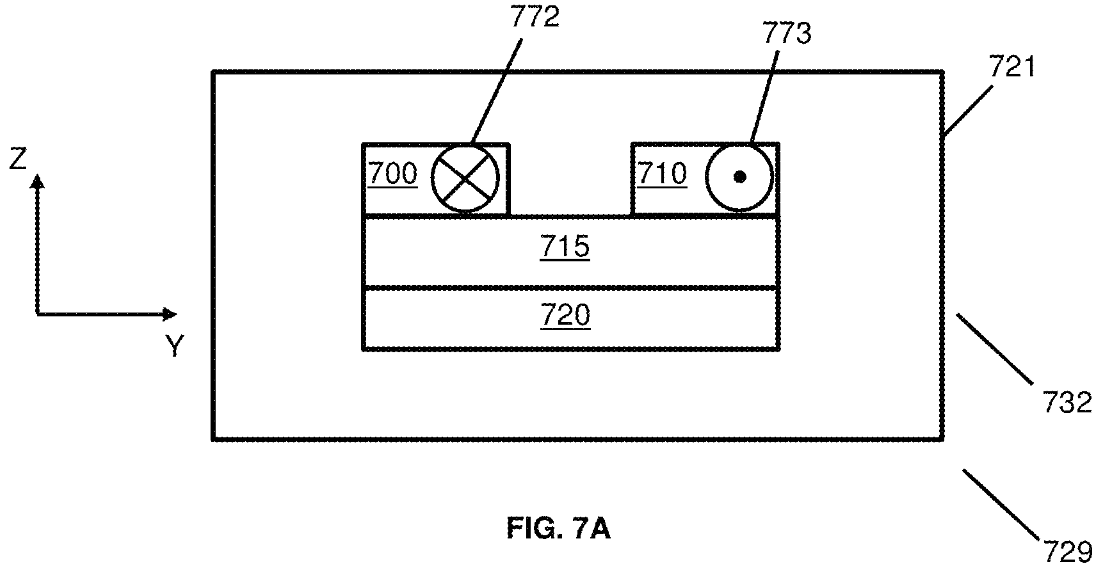
FIG. 7A illustrates an embodiment of an operation of the transmission device of FIG. 7.

As shown in FIG. 7A, electromagnetic radiations with a first (linear) polarization (e.g. along axis Y of the Y-Z coordinate plane) induce that at least part of the first conductor 700 and of the second conductor 710 operate in the odd mode. In particular, in the intermediate portion 732 of the transmission device 729, a first electric current 772 in the first conductor 700 and a second electric current 773 in the second conductor 710 propagate along opposite directions. According to some embodiments, in this configuration, there is no electric current (or a minimal electric current) in the third conductor 720 and in the fourth conductor 721.

At the first end (similar to e.g. first end 530) of the transmission device 729 which is located in the first waveguide 107, electromagnetic radiations in the first frequency range and with a linear polarization are generated by the transmission device 729 (in particular by the terminal portion which includes terminal portions of the first and second conductors 700, 710 acting as a dipole) and transmitted in the first waveguide 107.

Similarly, when the antenna operates in reception, electromagnetic radiations with the first linear polarization in the first waveguide 107 can be received by the transmission device 729 which in turn transmits electromagnetic radiation with a linear polarization (using an odd mode in the first and second conductors 700, 710, and a minimal electric current in the third and fourth conductors 720, 721).

The direction of the linear polarization of the electromagnetic radiations received by the transmission device 729 can be the same as the direction of the linear polarization of electromagnetic radiations transmitted by the transmission device 729, or they can be different one from the other (see e.g. architecture of FIG. 5D or FIG. 5F, which can be used also herein—as mentioned above, the angle between the two directions of the polarizations can be different from 90 degrees).

Figure 7B:
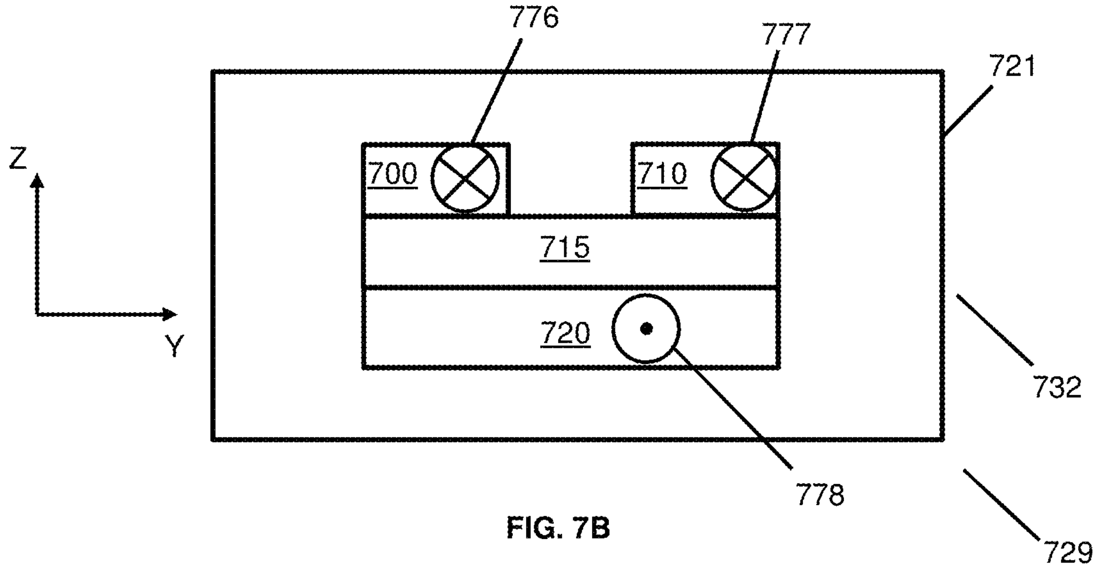
FIG. 7B illustrates another embodiment of an operation of the transmission device of FIG. 7.

Attention is drawn to FIG. 7B.

Electromagnetic radiations with a second (linear) polarization (e.g. substantially parallel to the main direction along which the first conductor 700 and the second conductor 710 extend in the intermediate portion 732) induce that at least part of the first conductor 700 and of the second conductor 710 operate in the even mode. In particular, in the intermediate portion 732 of the transmission device 729, the first current 776 in the first conductor 700 and the second current 777 in the second conductor 710 propagate along the same directions. In addition, an electric current 778 is generated in the third conductor 720. The electric current 778 has a direction which is opposite to the direction of the first current 776 and the second current 777. According to some embodiments, in this configuration, there is no electric current (or a minimal electric current) in the fourth conductor 721.

At the first end (similar to e.g. first end 530 of FIG. 5) of the transmission device 729 which is located in the first waveguide 107, electromagnetic radiations with a linear polarization are generated by the transmission device 729 (in particular by the terminal portion which includes terminal portions of the first and second conductors 700, 710 acting as a monopole) and transmitted in the first waveguide 107. In addition, electromagnetic radiations transmitted in the first waveguide 107 are also located in the first frequency range.

Similarly, when the antenna operates in reception, electromagnetic radiations with the second polarization in the first waveguide 107 can be received by the transmission device 729, which, in turn, transmits electromagnetic radiation with a linear polarization (using an even mode in the first and second conductors 700, 710, an opposite current in the third conductor 720, and a minimal current in the fourth conductor 721).

The direction of the second linear polarization of the electromagnetic radiations received by the transmission device 729 can be the same as the direction of the linear polarization of electromagnetic radiations transmitted by the transmission device 729, or they can be different one from the other (see e.g. architecture of FIG. 5D or FIG. 5F, which can be used also herein—as mentioned above, the angle between the two directions of the polarizations can be different from 90 degrees).

According to some embodiments, the transmission device 729 is operative to receive electromagnetic radiations with two orthogonal polarizations from the third waveguide 111 and to transmit electromagnetic radiations with two orthogonal polarizations in the first waveguide 107, or conversely, while maintaining frequency of the electromagnetic radiations in the first frequency range. As mentioned above, the directions of the two orthogonal polarizations received by the transmission device 729 can be different from the directions of the two orthogonal polarizations transmitted by the transmission device 729.

According to some embodiments, the transmission device 729 is operative to receive electromagnetic radiations with a circular polarization from the third waveguide 111 and to transmit electromagnetic radiations with a circular polarization to the first waveguide 107 (or conversely).

According to some embodiments, the transmission device 729 is operative to receive electromagnetic radiations with an elliptical polarization from the third waveguide 111 and to transmit electromagnetic radiations with an elliptical polarization to the first waveguide 107 (or conversely).

Figure 8A:
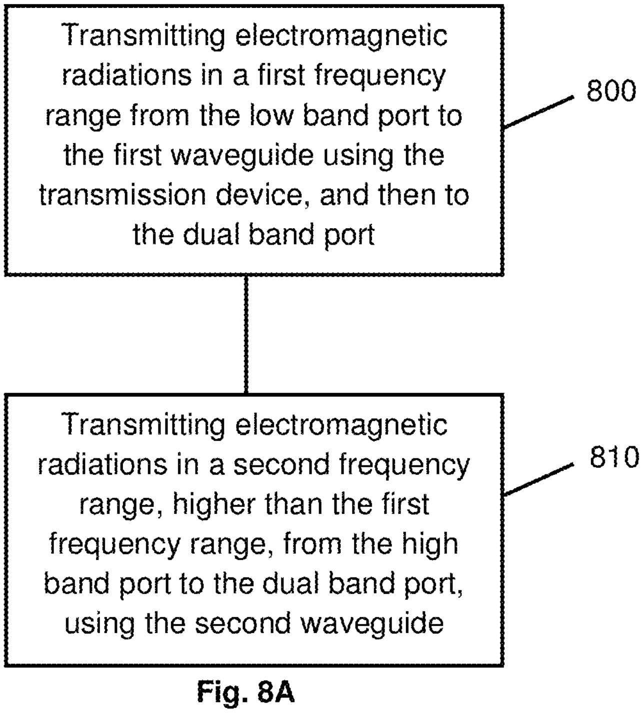
FIG. 8A illustrates an embodiment of a method of operating an antenna including the diplexer, wherein the antenna operates in transmission.

Attention is now drawn to FIG. 8A, which illustrates an embodiment of a method of operating an antenna including the diplexer 100, wherein the antenna operates in transmission.

The method includes transmitting (reference 800) electromagnetic radiations (in the first frequency range, as defined above) from the low band port 116 of the third waveguide 111 to the first waveguide 107 using the transmission device (see reference 129 in FIGS. 1, 1A, see reference 529 in FIG. 5, see reference 629 in FIG. 6, see reference 729 in FIGS. 7, 7A and 7B), and then to the dual band port 110. As mentioned above, a linear polarization induces transmission of a linear polarization, and separation between orthogonal polarization(s) of the electromagnetic radiations is (are) maintained between the third waveguide 111 and the first waveguide 107. Similarly, a circular polarization or an elliptical polarization can be received by the transmission device from the third waveguide 111 and transmitted to the first waveguide 107.

The method also comprises transmitting (reference 810) electromagnetic radiations (in the second frequency range higher than the first frequency range) from the high band port 115 to the dual band port 110 using the second waveguide 108.

Operations 800 and 810 can occur simultaneously.

Figure 8B:
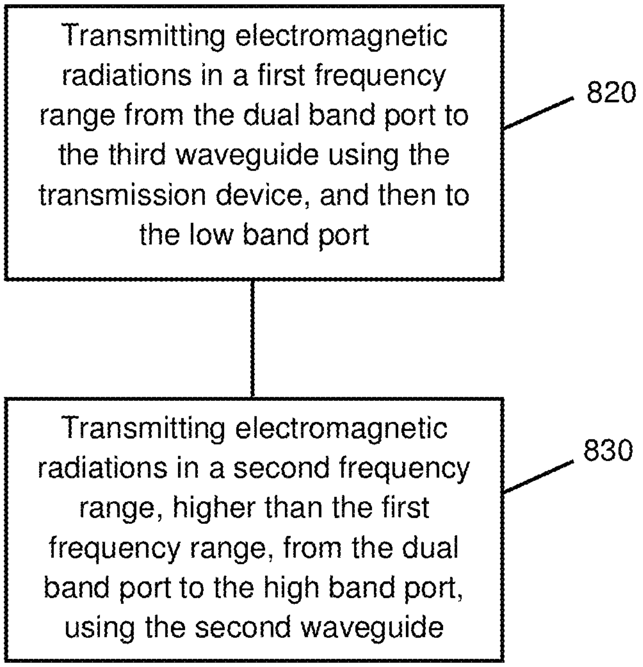
FIG. 8B illustrates an embodiment of a method of operating an antenna including the diplexer, wherein the antenna operates in reception.

Attention is now drawn to FIG. 8B, which illustrates an embodiment of a method of operating an antenna including the diplexer 100, wherein the antenna operates in reception.

Figure 1A:
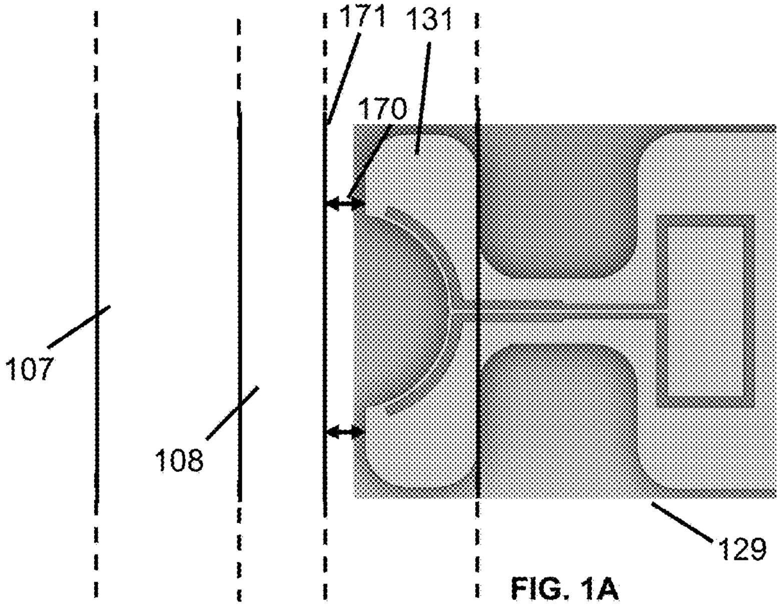
FIG. 1A illustrates a transmission device and waveguides of the diplexer.

The method includes transmitting (reference 820) electromagnetic radiations (in the first frequency range) from the dual band port 110 to the first waveguide 107 and then to the third waveguide 111 using the transmission device (see reference 129 in FIGS. 1, 1A, see reference 529 in FIG. 5 and see reference 629 in FIG. 6). The electromagnetic radiations can then reach the low band port 116. As mentioned above, a linear polarization induces transmission of a linear polarization, and separation between orthogonal polarization(s) of the electromagnetic radiations is (are) maintained between the third waveguide 111 and the first waveguide 107. Similarly, a circular polarization or an elliptical polarization can be received by the transmission device from the first waveguide 107 and transmitted to the third waveguide 111.

The method also comprises transmitting (reference 830) electromagnetic radiations (in the second frequency range higher than the first frequency range) from the dual band port 110 to the high band port 115 using the second waveguide 108.

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A diplexer for an antenna, comprising:

a first waveguide configured to communicate electromagnetic radiations falling in a first frequency range, a second waveguide located within the first waveguide, the second waveguide being configured to communicate electromagnetic radiations falling in a second frequency range, wherein the second frequency range is higher than the first frequency range, a third waveguide configured to communicate the electromagnetic radiations falling in the first frequency range, and a transmission device comprising at least three electric conductors, the at least three electric conductors comprising:

a first electric conductor associated with a first end located within the first waveguide, and a second end located within the third waveguide, a second electric conductor associated with a first end located within the first waveguide, and a second end located within the third waveguide, a third electric conductor, wherein the first and second electric conductors are at least partially located within the third electric conductor, or the first and second electric conductors are at least partially located on the third electric conductor, wherein at least one of (i) or (ii) is met:

(i) the transmission device is operative to receive the electromagnetic radiations with at least one type of polarization and falling in the first frequency range from the third waveguide and to transmit the electromagnetic radiations with the at least one type of polarization and falling in the first frequency range to the first waveguide;

(ii) the transmission device is operative to receive the electromagnetic radiations with the at least one type of polarization and falling in the first frequency range from the first waveguide and to transmit the electromagnetic radiations with the at least one type of polarization and falling in the first frequency range to the third waveguide.

2. The diplexer of claim 1, wherein at least one of (i) or (ii) is met:

(i) the at least one type of polarization comprises a linear polarization;

(ii) the at least one type of polarization comprises two orthogonal linear polarizations.

3. The diplexer of claim 1, wherein the at least one type of polarization comprises two different orthogonal polarizations.

4. The diplexer of claim 1, wherein the at least one type of polarization comprises a circular polarization.

5. The diplexer of claim 1, wherein the at least one polarization comprises an elliptical polarization.

6. The diplexer of claim 1, wherein a portion of the first and second electric conductors is configured to operate in at least one of two electric modes, the two electric modes comprising:

an odd mode;

an even mode.

7. The diplexer of claim 1, wherein the at least one type of polarization comprises a linear polarization inducing an odd mode in at least a portion of the first and second electric conductors of the transmission device.

8. The diplexer of claim 1, wherein the transmission device is operative to pass the electromagnetic radiations with the at least one type of polarization and falling in the first frequency range between the third waveguide and the first waveguide, wherein the at least one type of polarization comprises a linear polarization, wherein a direction of the linear polarization is identical between the third waveguide and the first waveguide, or is different between the third waveguide and the first waveguide.

9. The diplexer of claim 1, wherein the at least one type of polarization comprises a linear polarization inducing an even mode in at least a portion of the first and second electric conductors of the transmission device.

10. The diplexer of claim 9, wherein the transmission device is operative to pass the electromagnetic radiations with the linear polarization and falling in the first frequency range between the third waveguide and the first waveguide, wherein a direction of the linear polarization is identical between the third waveguide and the first waveguide, or is different between the third waveguide and the first waveguide.

11. The diplexer of claim 1, wherein the at least one type of polarization comprises a linear polarization inducing an even mode with electric currents along a first direction in at least a portion of the first and second electric conductors and an electric current in the third electric conductor of the transmission device along a second direction opposite to the first direction.

12. The diplexer of claim 1, wherein the at least one type of polarization comprises two orthogonal linear polarizations which induce both an even mode and an odd mode in at least a portion of the first and second electric conductors.

13. The diplexer of claim 1, wherein at least one of (i), or (ii), or (iii) is met:

(i) in the first waveguide, an angle between a first part of the first electric conductor of the at least three electric conductors, and a first part of the second electric conductor of the at least three electric conductors, is above ten degrees;

(ii) in the third waveguide, an angle between a second part of the first electric conductor of the at least three electric conductors, and a second part of the second electric conductor of the at least three electric conductors, is above ten degrees;

(iii) a portion of the transmission device located in the first waveguide has a semi-circular shape.

14. The diplexer of claim 1, wherein a minimal distance between the transmission device and an external wall of the second waveguide is equal to or greater than $\lambda_{max,\ HB}/16$, wherein $\lambda_{max,\ HB}/16$ is a maximal wavelength of the second frequency range.

15. The diplexer of claim 1, wherein the transmission device comprises a printed circuit board (PCB), wherein:

the first electric conductor and the second electric conductor are located on a same side of the PCB, or the first electric conductor and the second electric conductor are located on opposite sides of the PCB.

16. The diplexer of claim 1, wherein the transmission device comprises an intermediate portion in which at least part of the first electric conductor of the transmission device and at least part of the second electric conductor of the transmission device are substantially parallel.

17. The diplexer of claim 1, wherein a maximal dimension of a cross section of an intermediate portion of the transmission device, located between the first waveguide and the third waveguide, is smaller than $\lambda_{max,\ HB}$, wherein $\lambda_{max,\ HB}$ corresponds to a maximal wavelength of the second frequency range.

18. A method of operating a diplexer for an antenna, comprising:

receiving, by a transmission device comprising at least three electric conductors, electromagnetic radiations in a first frequency range and with at least one type of polarization from a third waveguide of the diplexer, the at least three electric conductors comprising:

a first electric conductor associated with a first end located within a first waveguide, and a second end located within the third waveguide, a second electric conductor associated with a first end located within the first waveguide, and a second end located within the third waveguide, a third electric conductor, wherein the first and second electric conductors are at least partially located within the third electric conductor, or the first and second electric conductors are at least partially located on the third electric conductor, transmitting, by the transmission device, the electromagnetic radiations in the first frequency range and with the at least one type of polarization to the first waveguide of the diplexer, the first waveguide transmitting the electromagnetic radiations to a dual band port of the diplexer, and transmitting electromagnetic radiations in a second frequency range, higher than the first frequency range, from a high band port of the diplexer to the dual band port of the diplexer, using a second waveguide of the diplexer, or receiving, by the transmission device comprising the at least three electric conductors, the electromagnetic radiations in the first frequency range and with the at least one type of polarization from the first waveguide of the diplexer, transmitting, by the transmission device, the electromagnetic radiations in the first frequency range and with the at least one type of polarization to the third waveguide of the diplexer, the third waveguide transmitting the electromagnetic radiations to a low band port of the diplexer, and transmitting the electromagnetic radiations in the second frequency range, higher than the first frequency range, from the dual band port of the diplexer to the high band port of the diplexer, using the second waveguide of the diplexer.

19. An antenna, comprising a diplexer comprising:

a first waveguide configured to communicate electromagnetic radiations falling in a first frequency range, and a second waveguide located within the first waveguide, the second waveguide being configured to communicate electromagnetic radiations falling in a second frequency range, wherein the second frequency range is higher than the first frequency range, a third waveguide configured to communicate the electromagnetic radiations falling in the first frequency range, a transmission device comprising at least three electric conductors, the at least three electric conductors comprising:

a first electric conductor associated with a first end located within the first waveguide, and a second end located within the third waveguide, a second electric conductor associated with a first end located within the first waveguide, and a second end located within the third waveguide, a third electric conductor, wherein the first and second electric conductors are at least partially located within the third electric conductor, or the first and second electric conductors are at least partially located on the third electric conductor, wherein at least one of (i) or (ii) is met:

(i) the transmission device is operative to receive the electromagnetic radiations with at least one type of polarization and falling in the first frequency range from the third waveguide and to transmit the electromagnetic radiations with the at least one type of polarization and falling in the first frequency range to the first waveguide;

(ii) the transmission device is operative to receive the electromagnetic radiations with the at least one type of polarization and falling in the first frequency range from the first waveguide and to transmit the electromagnetic radiations with the at least one type of polarization and falling in the first frequency range to the third waveguide, and a dish, configured to reflect at least the electromagnetic radiations falling in the first frequency range and the electromagnetic radiations falling in the second frequency range towards the diplexer or transmitted by the diplexer.

* * * * *